Feb. 22, 1927.
S. A. D. COX
1,618,270
ROTARY DISK BORING TOOL
Filed April 21, 1926
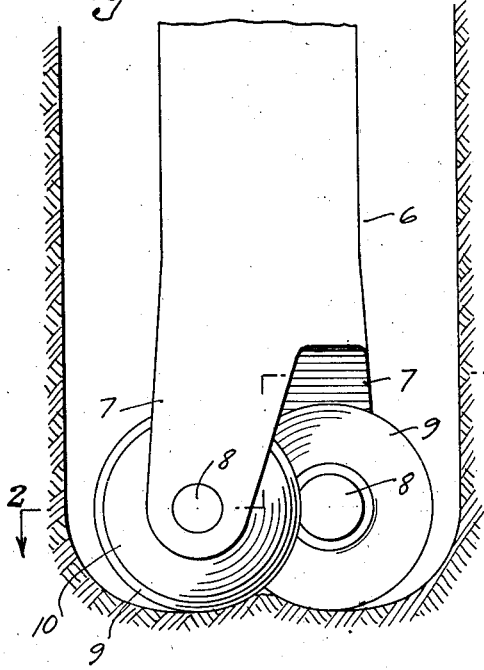
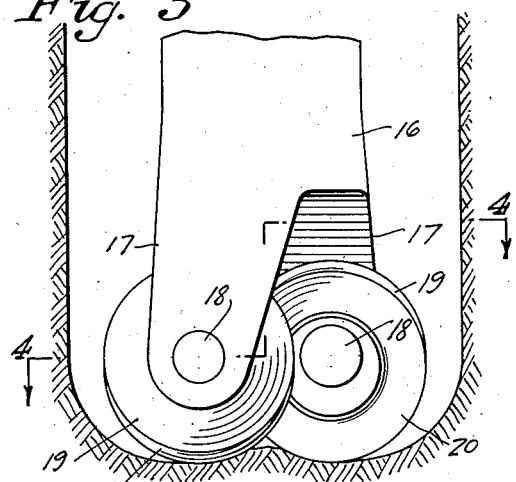
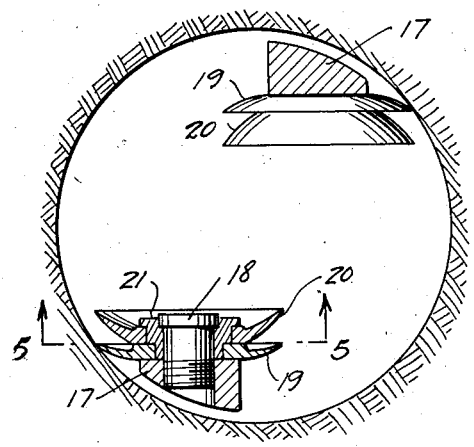
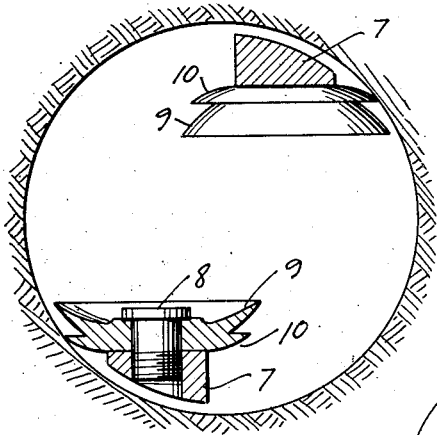
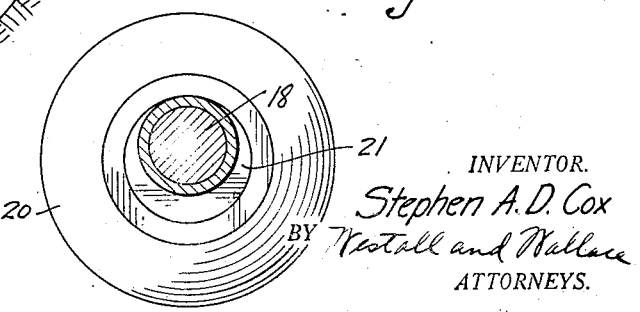
INVENTOR.
Stephen A. D. Cox
BY Westall and Wallace
ATTORNEYS.

Patented Feb. 22, 1927.

1,618,270

UNITED STATES PATENT OFFICE.

STEPHEN A. D. COX, OF ONTARIO, CALIFORNIA.

ROTARY-DISK BORING TOOL.

Application filed April 21, 1926. Serial No. 103,453.

This invention relates to a rotary disk boring tool wherein rotary disk cutters are employed. Such tools, commonly known as rotary disk bits, comprise a body to which are rotatably attached disks having cutting edges. The disks are arranged to be revolved by the body whereby they will sweep over and abrade or shear off the formation so as to "make hole", and at the same time the disks will be rotated to progressively bring all the portions of their edges into action.

The disks of such cutters are arranged so that they advance making a bull nosed cut, thereby cutting at the front and side. If the disks are not engaged with the advance wall or bottom of the hole, they will not be rotated during their revolution. In going into a hole which is smaller than the overall diameter of the tool, the disks will in their revolution trim the side wall but fail to rotate and thereby wear away at one spot on the cutting edge so that by the time the tool has reached the bottom, a flat spot will have been worn at the edge. This condition of the disks either prevents or impedes the rotation thereof and consequently their efficiency.

The present invention has for its primary object the provision of a rotary disk bit having disks arranged so that there are groups of cutting edges comprising a plurality of edges located side by side. More specifically, it is an object of this invention to provide a tool of the character described in which a disk has a plurality of cutting edges which divide the labor of "making hole," and one of which may bear a greater burden of cutting to the side of the hole than another of the edges and the last mentioned edge extends forwardly in the advance direction, so that it may perform the greater burden of cutting in front. It is a further object of this invention to provide a disk having twice the wearing surface of that of the ordinary single edge disk thereby enabling the disks to rotate under greater weight or pressure and lengthening the life of the disks.

These objects together with other objects and corresponding accomplishments are obtained by means of the embodiment of my invention illustrated in the accompanying drawing, in which:

Fig. 1 is an elevation of a drill disposed within a hole in the position of cutting the formation; Fig. 2 is a section as seen on the line 2—2 of Fig. 1; Fig. 3 is an elevation of a bit involving a modified form of my invention; Fig. 4 is a section as seen on the line 4—4 of Fig. 3; and Fig. 5 is a section on an enlarged scale as seen on the line 5—5 of Fig. 4.

Referring more particularly to Figs. 1 and 2, a drill head or body is indicated by 6. This body may be of the form well known in the art, only a fragment thereof being shown. It is arranged to be attached to a drill pipe whereby it may be rotated. The body is shown as provided with legs 7, and mounted in the legs are spindles 8. These spindles form journals for rotary disks which are mounted thereon. The spindles have axes which are non-radial to the axis of rotation of the drill head. In the form shown in Figs. 1 and 2, the spindles are normal to the axis of the drill head. This is a common construction for rotary disk bits. My invention differs from the ordinary disk bit in the character of the disk.

Each disk comprises a plurality of cutting edges, preferably a pair. There is an inner cutting edge 9 which is shown arranged concentric and parallel to an outer cutting edge 10. The outer cutting edge is shown of such a diameter that it will engage the side wall of the hole at the forward advancing portion, see Fig. 2, whereas, the inner cutting edge is out of contact with the side wall at its forward advancing portion. An inspection of Fig. 2 shows this condition, even though the inner cutting edge is of greater diameter than the outer. The outer cutting edge being of greater diameter will extend further forward in the advance direction of the tool as best shown in Fig. 1. It is obvious that with the construction just described, the outer cutting edge performs the greater burden of cutting the side wall, whereas the inner cutting edge performs the greater burden of cutting the advance wall. Both the cutting edges are out of contact with the side wall of the hole at the rear following portion thereby clearing the latter and performing no cutting function at this portion. However, if the edges were of the same diameter the inner edge would cut less of the wall to the side than the outer. In the front the cutting action is divided, the inner edge doing the greater part of its cutting within a cutting area disposed inside the cutting area of the outer disk. The inner disk tracks within the outer. The inner disk may be made sufficiently large to bear the same burden of cutting to the side as the outer. However, the disks do not track each other at the front and the front cutting work is divided.

Referring more particularly to the embodiment of the invention shown in Figs. 3, 4, and 5, the drill head or body is indicated by 16 and is provided with legs 17. The legs may spread outwardly and mounted therein are eccentric bushings 21 in which are spindles 18. The spindles are disposed so that they are not normal to the axis of the drill head, but inclined downwardly toward one another. In the construction just described the disks are shown as formed of two members 19 and 20 of the same diameter. The operation of the disks is the same as that before described. The bushing permits the members to be arranged to rotate about separate axes. Upon rotation of the drill head, the disks are revolved being dragged over the formation to cut the same by a shearing action, and at the same time a component of the motion causes rotation of the disks. This causes a progressive presentation of the cutting edge to the work.

It will be noted that the cutting edges do not track each other on the front wall in their revolutions. The path of the outer cutting edge is of greater diameter than the path of the inner cutting edge.

What I claim is:

A rotary disk bit comprising the combination of a rotatable body, cutters journalled on axes non-radial to the axis of rotation of said body, each of said cutters having a pair of spaced apart parallel circular cutting edges arranged to clear the side wall of the hole at the rear following portion, the outer cutting edge of each cutter extending a greater radial distance from the axis of rotation of said body at the forward advancing portion than the inner cutting edge whereby the outer cutting edge cuts more at the side of the hole than the inner, the inner cutting edge of each cutter being of greater diameter than the outer cutting edge.

In witness that I claim the foregoing I have hereunto subscribed my name this 12th day of April, 1926.

STEPHEN A. D. COX.